United States Patent
Tsuda et al.

(10) Patent No.: US 12,466,258 B2
(45) Date of Patent: Nov. 11, 2025

(54) DISPLAY CONTROL DEVICE, DISPLAY CONTROL METHOD, NON-TRANSITORY COMPUTER-READABLE MEDIUM STORING A PROGRAM

(71) Applicant: TOYOTA JIDOSHA KABUSHIKI KAISHA, Toyota (JP)

(72) Inventors: Hideki Tsuda, Nagoya (JP); Toshinori Aoki, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 182 days.

(21) Appl. No.: 18/225,754

(22) Filed: Jul. 25, 2023

(65) Prior Publication Data

US 2024/0083246 A1 Mar. 14, 2024

(30) Foreign Application Priority Data

Sep. 13, 2022 (JP) ................ 2022-145208

(51) Int. Cl.
| | |
|---|---|
| *B60K 35/00* | (2024.01) |
| *G06V 20/59* | (2022.01) |
| *B60K 35/10* | (2024.01) |
| *B60K 35/23* | (2024.01) |
| *B60K 35/28* | (2024.01) |
| *B60K 35/29* | (2024.01) |

(52) U.S. Cl.
CPC ............ *B60K 35/00* (2013.01); *G06V 20/597* (2022.01); *B60K 35/10* (2024.01); *B60K 35/23* (2024.01); *B60K 35/28* (2024.01); *B60K 35/29* (2024.01); *B60K 2360/149* (2024.01); *B60K 2360/177* (2024.01); *B60K 2360/188* (2024.01)

(58) Field of Classification Search
CPC ........ B60K 35/00; B60K 35/10; B60K 35/23; B60K 35/28; B60K 35/29; B60K 2360/149; B60K 2360/177; B60K 2360/188; B60K 35/235; G06V 20/597; G02B 27/0101; G02B 2027/0138; G02B 2027/014; G02B 2027/0196
See application file for complete search history.

(56) References Cited

U.S. PATENT DOCUMENTS

| | | | | |
|---|---|---|---|---|
| 9,620,017 | B2* | 4/2017 | Trageser | B60W 10/184 |
| 10,960,761 | B2* | 3/2021 | Tachibana | B60W 50/14 |
| 11,180,150 | B2* | 11/2021 | Engel | G05D 1/0276 |
| 2018/0322673 | A1* | 11/2018 | Choi | G01P 15/08 |
| 2019/0351839 | A1 | 11/2019 | Tsuruta | |
| 2020/0156472 | A1* | 5/2020 | Fukasawa | B60K 35/81 |
| 2020/0211290 | A1* | 7/2020 | Choi | G06V 20/582 |

(Continued)

FOREIGN PATENT DOCUMENTS

| | | |
|---|---|---|
| JP | H07-061257 A | 3/1995 |
| JP | 2002-083400 A | 3/2002 |

(Continued)

*Primary Examiner* — Richard M Camby
(74) *Attorney, Agent, or Firm* — Oliff PLC

(57) ABSTRACT

A display control device installed in a vehicle and forming an AR image corresponding to a display target object at a position in front of the vehicle in a hypothetical display area set in front of the vehicle. The display control device causes the AR image to disappear from the hypothetical display area while being faded out when a first specific condition has been satisfied after the AR image was formed.

9 Claims, 6 Drawing Sheets

(56) References Cited

U.S. PATENT DOCUMENTS

2021/0225055 A1* 7/2021 Choi .................. G02B 27/0101
2023/0009636 A1* 1/2023 Zhang .................... B60K 35/00

FOREIGN PATENT DOCUMENTS

| JP | 2019-199135 A | 11/2019 |
| JP | 2019-217790 A | 12/2019 |
| JP | 2022-083609 A | 6/2022 |

* cited by examiner

DISPLAY CONTROL DEVICE, DISPLAY CONTROL METHOD, NON-TRANSITORY COMPUTER-READABLE MEDIUM STORING A PROGRAM

CROSS-REFERENCE TO RELATED APPLICATION

This application claims priority under 35 USC 119 from Japanese Patent Application No. 2022-145208, filed on Sep. 13, 2022, the disclosure of which is incorporated by reference herein.

BACKGROUND

Technical Field

The present disclosure relates to a display control device, a display control method, and a non-transitory computer-readable medium storing a program.

Related Art

A head-up display disclosed in JP-A No. 2019-199135, is capable of displaying an image representing a moving body at a position in front of a vehicle.

A driver who has seen the image formed by the head-up display sometimes feels annoyed by this image. There is room for improvement on the technology of JP-A No. 2019-199135, in relation to making a driver who has seen the image formed by the head-up display not liable to feel annoyed.

SUMMARY

The present disclosure provides a display control device, a display control method, and a non-transitory computer-readable medium storing a program that may form an AR image not liable to make a driver of a vehicle feel annoyed.

A first aspect of the present disclosure is a display control device that is installed to a vehicle and that forms an AR image corresponding to a display target object at a position in front of the vehicle in a hypothetical display area set in front of the vehicle, and that causes the AR image to disappear from the hypothetical display area while being faded out when a first specific condition has been satisfied after the AR image was formed.

Reference to "fading out" in the present specification and scope of patent claims encompasses gradually reducing a density of color of an AR image formed at a specific position in a hypothetical display area so as to gradually reduce a contrast between an area peripheral to the AR image in the hypothetical display area and the AR image itself, such that the AR image finally disappears from the hypothetical display area. Furthermore, reference to "fading out" in the present specification and scope of patent claims encompasses moving an AR image displayed at a first specific position in a hypothetical display area from the first specific position to a second specific position, and causing the AR image to disappear from the hypothetical display area at the second specific position. Note that a distance from the second specific position to an outside edge of the hypothetical display area is shorter than a distance from the first specific position to the outside edge of the hypothetical display area.

The display control device of the first aspect of the present disclosure forms the AR image corresponding to the display target object at the position in front of the vehicle in the hypothetical display area set in front of the vehicle. Furthermore, the display control device causes the AR image to disappear from the hypothetical display area while being faded out when the first specific condition has been satisfied after the AR image was formed. The AR image formed by the display control device of the first aspect of the present disclosure is accordingly less liable to make a driver feel annoyed when disappearing from the hypothetical display area than an AR image that disappears without being faded out.

In a second aspect of the present disclosure, in the first aspect, the AR image may be formed in the hypothetical display area while being faded in when a second specific condition has been satisfied.

Reference to "fading in" in the present specification and scope of patent claims encompasses gradually increasing a density of color of an AR image formed at a specific position in a hypothetical display area so as to gradually increase a contrast between an area peripheral to the AR image in the hypothetical display area and the AR image itself. Moreover, reference to "fading in" in the present specification and scope of patent claims encompasses, after displaying an AR image at a second specific position in a hypothetical display area, changing the display position of the AR image from the second specific position to a first specific position. Note that a distance from the second specific position to an outside edge of the hypothetical display area is shorter than a distance from the first specific position to the outside edge of the hypothetical display area.

The display control device of a second aspect of the present disclosure forms the AR image in the hypothetical display area while being faded in when the second specific condition has been satisfied. The AR image formed by the display control device of the second aspect of the present disclosure is accordingly less liable to make a driver feel annoyed when being formed in the hypothetical display area than an AR image that is formed in the hypothetical display area without being faded in.

In a third aspect of the present disclosure, in the first aspect or the second aspect, there may be plural types of the AR image formable in the hypothetical display area, and only the AR image of a particular type may be caused to disappear from the hypothetical display area while employing the fading out.

In the display control device of the third aspect of the present disclosure, only the AR image of the particular type disappears from the hypothetical display area while being faded out. The display control device of the third aspect of the present disclosure is accordingly less liable to impart an unsettling feeling to a driver who has seen the AR image than cases in which all of the AR images are caused to disappear from the hypothetical display area while being faded out.

In a fourth aspect of the present disclosure, in the third aspect, a mode of the fading out may be changed according to the type of the AR image.

The display control device of the fourth aspect of the present disclosure changes the fade-out mode according to the type of the AR image. The display control device of the fourth aspect of the present disclosure is accordingly less liable to impart an unsettling feeling to a driver who has seen the AR image than cases in which the same fade-out mode is employed for fading out all of the AR images.

In a fifth aspect of the present disclosure, in the second aspect, there may be plural types of the AR image formable in the hypothetical display area, and only the AR image of a particular type may be formed in the hypothetical display area while employing the fading in.

The display control device of the fifth aspect of the present disclosure only forms the AR image of the particular type in the hypothetical display area while being faded in. The display control device of the fifth aspect of the present disclosure is accordingly less liable to impart an unsettling feeling to a driver who has seen the AR image than cases in which all of the AR images are formed in the hypothetical display area while being faded-in.

In a sixth aspect of the present disclosure, in the fifth aspect, a mode of the fading-in may be changed according to the type of the AR image.

The display control device of the sixth aspect of the present disclosure changes the fade-in mode according to the type of the AR image. The display control device of the sixth aspect of the present disclosure is accordingly less liable to impart an unsettling feeling to a driver who has seen the AR image than cases in which the same fade-in mode is employed to fade in all of the AR images.

In a seventh aspect of the present disclosure, in the first aspect or the second aspect, the first specific condition may be satisfied when a first time period has elapsed from a time when the AR image was formed in the hypothetical display area.

The display control device of the seventh aspect of the present disclosure causes the AR image to disappear from the hypothetical display area when a first time period has elapsed from the time when the AR image was formed in the hypothetical display area. This makes the AR image formed by the display control device of the seventh aspect of the present disclosure less liable to make a driver feel annoyed when disappearing from the hypothetical display area.

In an eighth aspect of the present disclosure, in the first aspect or the second aspect, the first specific condition may be satisfied when determined that a driver of the vehicle has seen the AR image based on imaging data acquired by an in-car camera provided to the vehicle.

Based on the imaging data acquired by the in-car camera provided to the vehicle, the display control device of the eighth aspect of the present disclosure causes the AR image to disappear from the hypothetical display area when determined that the driver of the vehicle has seen the AR image. This makes the AR image formed by the display control device of the eighth aspect of the present disclosure less liable to make a driver feel annoyed when disappearing from the hypothetical display area.

A ninth aspect of the present disclosure is a display control method including: forming an AR image corresponding to a display target object at a position in front of the vehicle in a hypothetical display area set in front of the vehicle, and causing the AR image to disappear from the hypothetical display area while being faded out when a first specific condition has been satisfied after the AR image was formed.

A tenth aspect of the present disclosure is a non-transitory computer-readable medium storing a program that causes a computer to execute processing of: forming an AR image corresponding to a display target object at a position in front of a vehicle in a hypothetical display area set in front of the vehicle, wherein the program causes the computer to execute processing of causing the AR image to disappear from the hypothetical display area while being faded out when a first specific condition has been satisfied after the AR image was formed.

According to the above aspects, a display control device, a display control method, and a non-transitory computer-readable medium storing a program according to the present disclosure may form an AR image that is not liable to make a driver of a vehicle feel annoyed.

BRIEF DESCRIPTION OF THE DRAWINGS

Exemplary embodiments will be described in detail based on the following figures, wherein.

DETAILED DESCRIPTION

Figure 1:
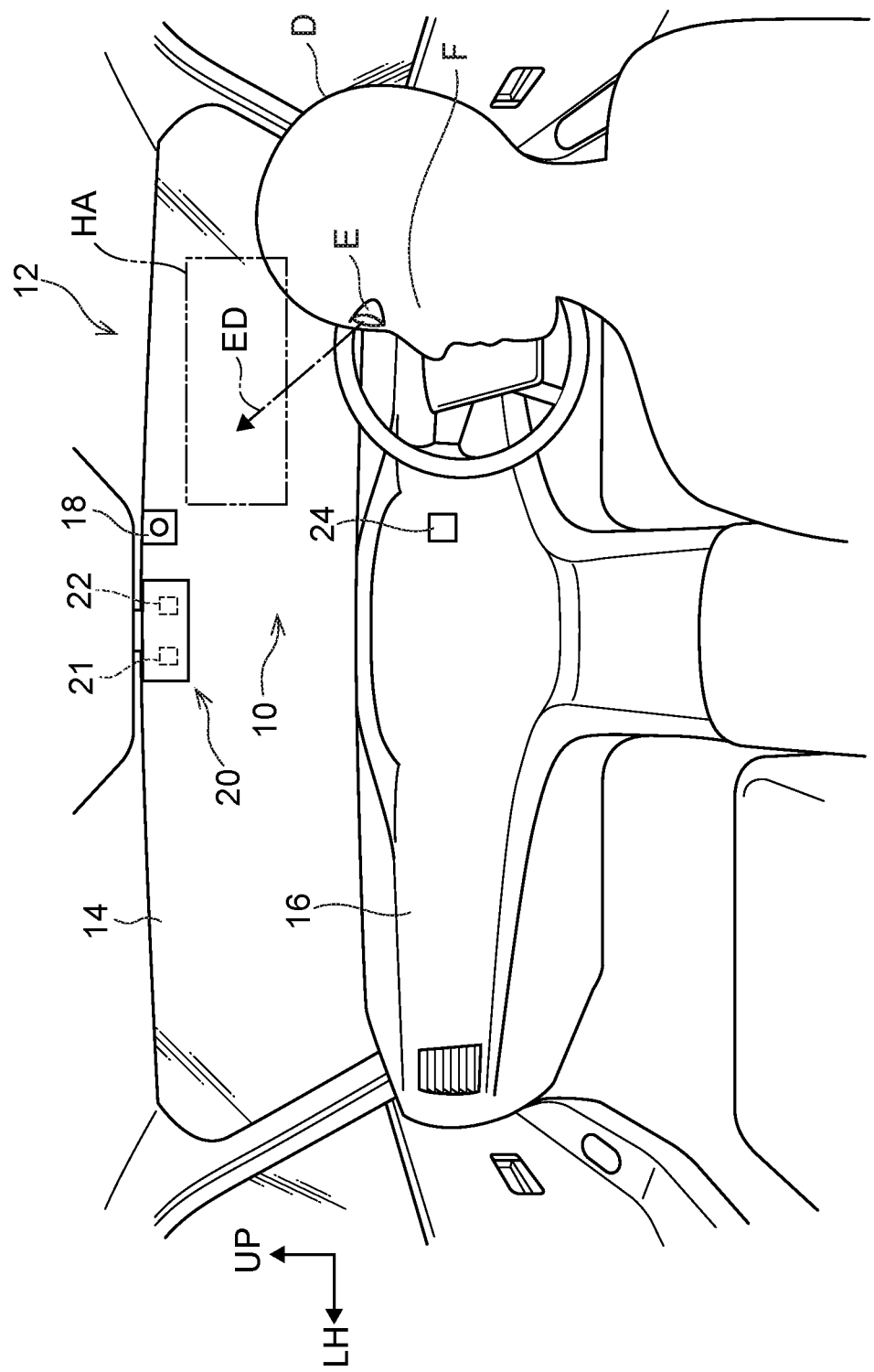
FIG. 1 is a diagram illustrating a vehicle interior of a vehicle equipped with a display control device according to an exemplary embodiment.

Description follows regarding exemplary embodiments of a display control device 10, a display control method, and a program according to the present disclosure, with reference to the drawings. As appropriate in the drawings, arrow FR indicates a front side in a vehicle front-rear direction, arrow LH indicates a left side in a vehicle left-right direction, and an arrow UP indicates an upper side in a vehicle height direction.

The display control device 10 of the present exemplary embodiment includes a display control ECU 26 and a projector device 30, described later. A vehicle 12 installed with the display control device 10 includes, as illustrated in FIG. 1, a front windshield 14 and an instrument panel 16. A driving assistance switch 24 is provided on the instrument panel 16. A gaze camera (in-car camera) 18 and a sensor unit 20 are provided to an upper portion at a vehicle interior face of the front windshield 14. The gaze camera 18 is capable of capturing an imaging subject positioned rearward of itself. For example, the gaze camera 18 is capable of imaging a face F of a driver D sat in the driver seat. The gaze camera 18 of the present exemplary embodiment includes an infrared illumination device and an infrared camera. The infrared illumination device illuminates the face F of the driver D and the periphery thereof with infrared rays, and the infrared camera images an imaging subject of the face F of the driver D, and a periphery thereof. The sensor unit 20 includes a camera 21 and a millimeter wave sensor 22. The camera 21 is capable of imaging an imaging subject positioned further toward the vehicle front than itself. The millimeter wave sensor 22 transmits probe waves forward and receives reflected waves. The driving assistance switch 24 is a switch to cause driving assistance control to be executed in the vehicle 12, as described later.

Figure 2:
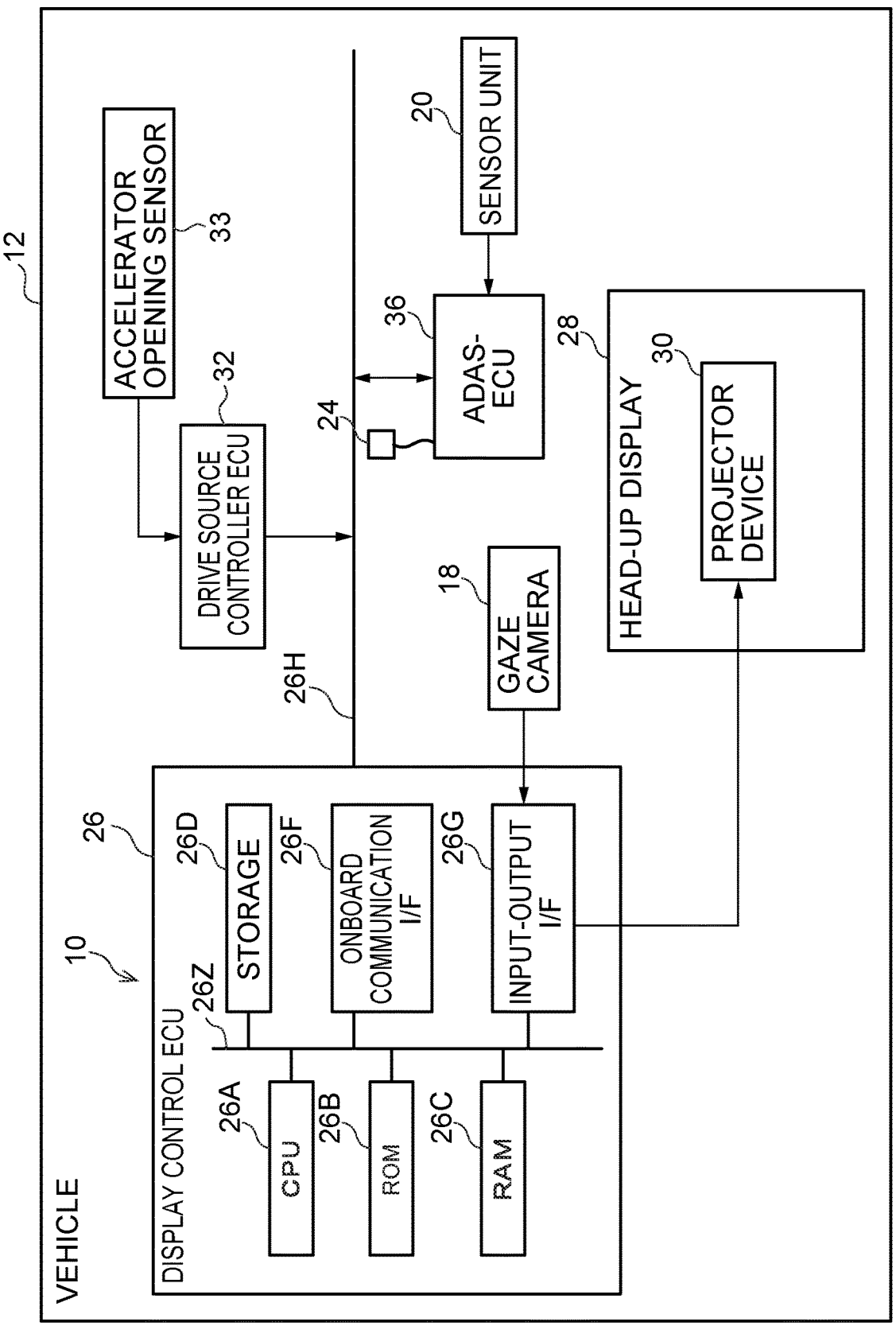
FIG. 2 is a diagram illustrating a hardware configuration of the vehicle illustrated in FIG. 1.

As illustrated in FIG. 2, as well as the gaze camera 18, the sensor unit 20, and the driving assistance switch 24, the vehicle 12 also includes, as hardware configuration, the display control ECU 26, a head-up display (HUD) 28, a drive source controller ECU 32, an accelerator opening sensor 33, and an ADAS-ECU 36.

The display control ECU 26 is configured including a central processing unit (CPU) 26A, read only memory (ROM) (non-transitory storage medium) (storage medium) 26B, random access memory (RAM) 26C, storage (non-transitory storage medium) (storage medium) 26D, an onboard communication I/F 26F, and an input-output I/F 26G. The CPU 26A, the ROM 26B, the RAM 26C, the storage 26D, the onboard communication I/F 26F, and the input-output I/F 26G are connected together through an internal bus 26Z so as to be capable of communicating with each other. The display control ECU 26 is capable of acquiring information related to date/time from a timer (omitted in the drawings).

The CPU 26A is a central processing unit that executes various programs and controls each section. The CPU 26A reads a program from the ROM 26B or the storage 26D, and executes the program using the RAM 26C as workspace. The CPU 26A controls each configuration and performs various computational processing according to the program recorded on the ROM 26B or on the storage 26D.

The ROM 26B stores various programs and various data. The RAM 26C serves as workspace to temporarily store programs and data. The storage 26D is configured by a storage device such as a hard disk drive (HDD), solid state drive (SSD), or the like, and is stored with various programs and various data.

The onboard communication I/F 26F is an interface for connecting to the ADAS-ECU 36 through an external bus 26H. This interface employs a communication standard such as, for example, a CAN protocol.

The input-output I/F 26G is an interface for communicating with the gaze camera 18 and the HUD 28.

Figure 3:
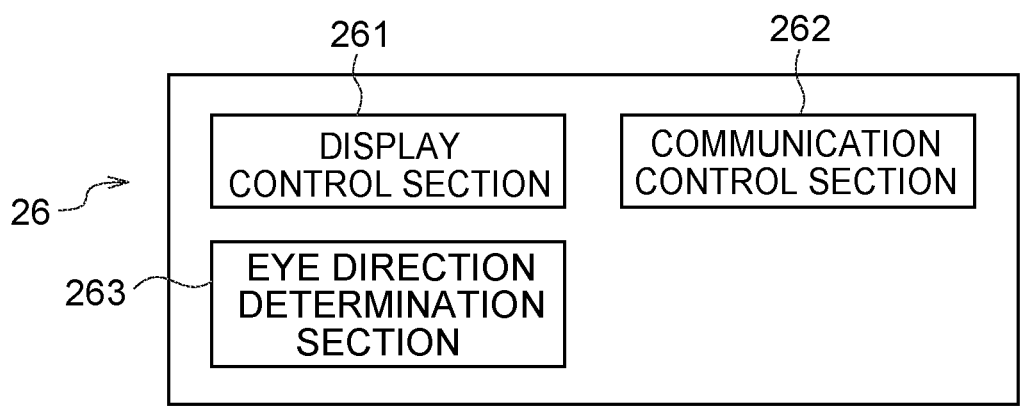
FIG. 3 is a functional block diagram of the display control ECU illustrated in FIG. 2.

FIG. 3 is a block diagram illustrating an example of a functional configuration of the display control ECU 26. The display control ECU 26 includes, as functional configuration, a display control section 261, a communication control section 262, and an eye direction determination section 263. The display control section 261, the communication control section 262, and the eye direction determination section 263 are implemented by the CPU 26A reading a program stored in the ROM 26B and executing the program.

The display control section 261 controls the HUD 28. Detailed description of a function of the display control section 261 is described later.

The communication control section 262 controls the onboard communication I/F 26F.

The eye direction determination section 263 performs image processing on imaging subject data when imaging data has been received from the gaze camera 18. The eye direction determination section 263 then employs, for example, a method such as those disclosed in Japanese Patent Application Laid-Open (JP-A) Nos. 2002-83400 and H07-61257 to compute (detect) an eye direction ED of the driver D (see the single dot broken line in FIG. 1). Note that when the driver D is looking forward as illustrated in FIG. 1, the eye direction ED extends forward from the driver D and passes through the front windshield 14 to the front side thereof.

The drive source controller ECU 32 and the ADAS-ECU 36 are each configured including a CPU, ROM (non-transitory storage medium) (storage medium), RAM, storage (non-transitory storage medium) (storage medium), an onboard communication I/F, and an input-output I/F, with these being connected together through an internal bus so as to be able to communicate with each other. The ADAS-ECU 36 is able to acquire information related to the date/time from a timer.

The accelerator opening sensor 33 is connected to the drive source controller ECU 32. The accelerator opening sensor 33 outputs, to the drive source controller ECU 32, a signal according to the degree of opening of the accelerator as changed by the driver D depressing an accelerator pedal (omitted in the drawings). The vehicle 12 includes electric motors (omitted in the drawings) connected to the drive source controller ECU 32 as drive sources. The drive source controller ECU 32 controls the electric motors based on the signal received from the accelerator opening sensor 33.

The sensor unit 20 is connected to the ADAS-ECU 36. Furthermore, the ADAS-ECU 36 is connected to various actuators for driving a brake device and a steering device. The ADAS-ECU 36 is connected to the above electric motors (actuators).

Figure 4:
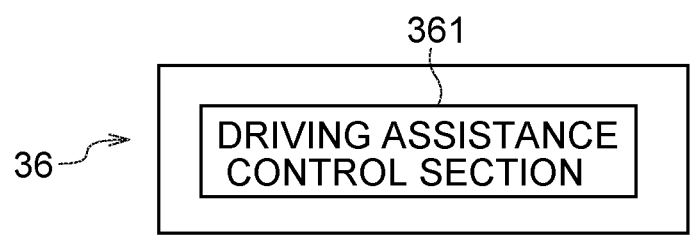
FIG. 4 is a functional block diagram of the ADAS-ECU illustrated in FIG. 2.

FIG. 4 illustrates a block diagram of an example of a functional configuration of the ADAS-ECU 36. The ADAS-ECU 36 includes, as functional configuration, a driving assistance control section 361. The driving assistance control section 361 is implemented by the CPU reading a program stored on the ROM and executing the program.

The driving assistance control section 361 controls the above group of actuators such that the vehicle 12 executes driving assistance control of level 1 to level 5 automation in the driving automation scale as defined by the Society of Automotive Engineers (SAE). The vehicle 12 is, for example, capable of executing adaptive cruise control (ACC) (control of inter-vehicle distance), cooperative adaptive cruise control (CACC) (control of inter-vehicle distance), lane change assistance control, and lane departure alert. The driving assistance switch 24 is switched between an ON state and an OFF state by being operated by an occupant. The vehicle 12 is able to execute driving assistance control when the driving assistance switch 24 is in the ON state. Moreover, by further operation of the driving assistance switch 24 when in the ON state, the occupant is able to execute driving assistance control freely selected from level 1 to level 5 in the vehicle 12.

Figure 5:
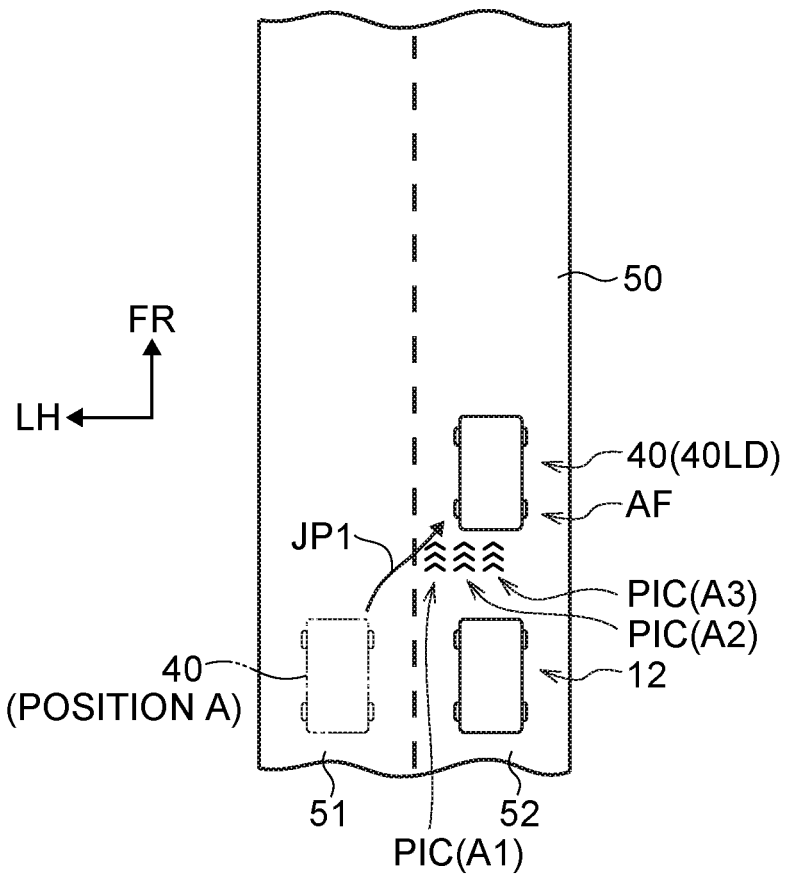
FIG. 5 is a schematic plan view of a vehicle and a lead vehicle traveling along a road.

Consider a case in which the vehicle 12 is executing ACC, and the vehicle 12 is traveling forward on a straight line shaped road 50, as illustrated in FIG. 5. The road 50 includes a vehicle lane 51 and a vehicle lane 52. The vehicle 12 is traveling in the vehicle lane 52. In FIG. 5 there is another vehicle 40 traveling forward in the vehicle lane 51 (see the feint broken lines) at a position at the left side of the vehicle 12. In such cases the relative position of the other vehicle 40 with respect to the vehicle 12 is defined as position A.

Consider a case in which the other vehicle 40 moves to the vehicle lane 52 while accelerating along a first movement track JP1 illustrated in FIG. 5 at a specific first time t1, and has moved to an area just in front AF of the vehicle 12 at a second time t2 after the first time t1. Based on data transmitted from the sensor unit 20 to the ADAS-ECU 36 in such a case, the driving assistance control section 361 specifies the other vehicle 40 as a lead vehicle 40LD. The driving assistance control section 361 moreover identifies a relative position (relative distance) of the other vehicle 40 with respect to the vehicle 12. The driving assistance control section 361 moreover controls the above group of actuators such that the inter-vehicle distance between the vehicle 12 and the other vehicle 40 is maintained at a set distance, which is an inter-vehicle distance set by an occupant using the driving assistance switch 24.

Detailed description follows regarding a function of the display control section 261.

Based on information related to the above relative position of the other vehicle 40 received from the ADAS-ECU

36 during execution of ACC, the display control section 261 identifies a relative position of the other vehicle 40 with respect to the vehicle 12. Description follows regarding a hypothetical display area HA illustrated in FIG. 6 and FIG. 7. The hypothetical display area HA set so as to be positioned in front of the front windshield 14 by a specific fixed distance has a landscape rectangular shape. The fixed distance is, for example, a freely selected distance of from 10 m to 15 m. When viewed along the left-right direction, the hypothetical display area HA is a planar virtual area inclined with respect to both the front-rear direction and height direction.

Figure 7:
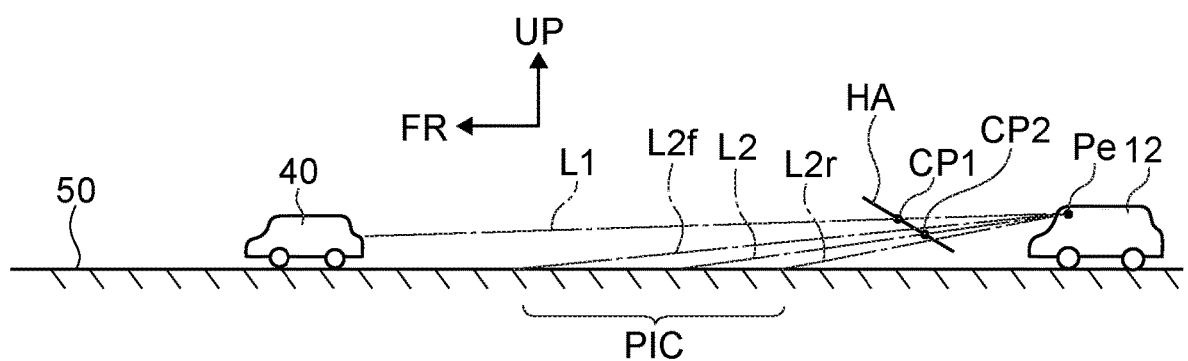
FIG. 7 is a schematic side view of a vehicle and a lead vehicle traveling on a road.

As illustrated in FIG. 7, based on the above relative position of the other vehicle 40 and the position of the vehicle 12, the display control section 261 computes a first straight line L1, which is a straight line connecting an eyeball reference position Pe and a center position of the other vehicle 40 together, and a first crossing point CP1, which is a crossing point between the first straight line L1 and the hypothetical display area HA. The eyeball reference position Pe is a specific position set in the interior space of the vehicle 12. Note that the first straight line L1 may be a straight line connecting a location (point) different from the center position of the lead vehicle 40 and the eyeball reference position Pe together.

Furthermore, the display control section 261 controls the HUD 28 provided to the projector device 30. Projection object data, including various characters, icons (graphics), and the like, is held in the ROM 26B or the storage 26D of the display control ECU 26. The projector device 30 controlled by the display control section 261 projects various types of AR image by reading in the projection object data from the ROM 26B or the storage 26D of the display control ECU 26. Such AR images include 2D images and 3D images. Namely, the HUD 28 is an augmented reality-head-up display (AR-HUD). The projector device 30 that has read in the projection object data then projects an AR image. The AR image projected by the projector device 30 is reflected forward by a reflection section (omitted in the drawings) provided to the vehicle 12. The AR image reflected forward by the reflection section is then formed as a virtual image VI in the hypothetical display area HA at a position in front of the front windshield 14. This virtual image is hereafter referred to as an AR image VI.

Figure 6:
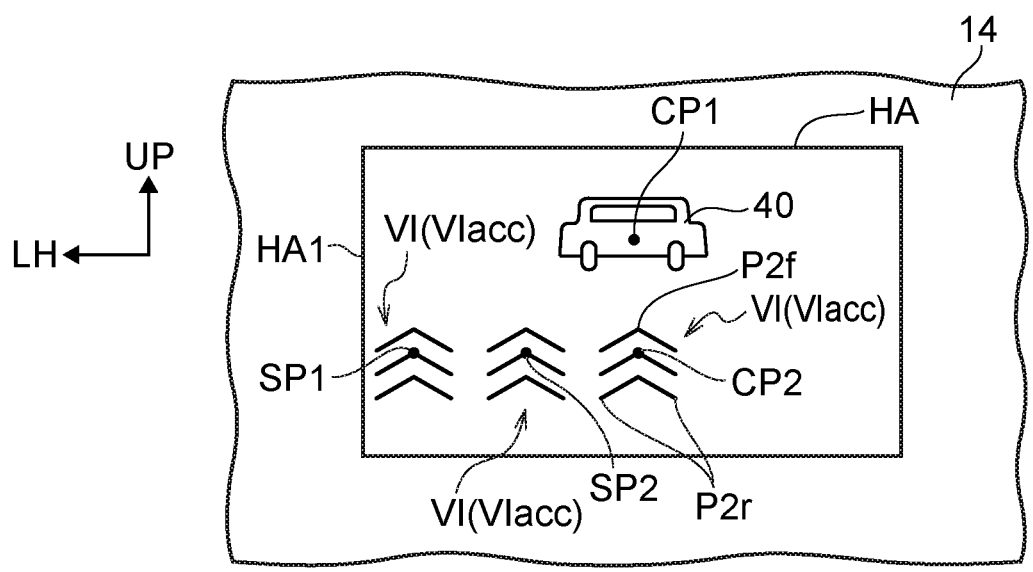
FIG. 6 is a graphic representation of a hypothetical display area as viewed by a driver of the vehicle of FIG. 5.

Explanation follows regarding actions of the display control section 261 when a specific fade-in condition (a second condition) has been satisfied. For example, the fade-in condition is satisfied when the driving assistance control section 361 has specified a lead vehicle for the vehicle 12 while the vehicle 12 is executing ACC. Furthermore, when determined that the fade-in condition has been satisfied based on information received from the ADAS-ECU 36, the display control section 261 displays an ACC image VIacc (see FIG. 6) that is a 3D AR image VI in the hypothetical display area HA while being faded in, as illustrated in FIG. 6.

The ACC image VIacc includes three images that each are formed in a substantially V shape. A second straight line L2 (see FIG. 7) is defined as a straight line connecting the eyeball reference position Pe and a specific position on the road 50 between the vehicle 12 and the other vehicle 40 together. A second crossing point CP2 is furthermore defined as being a crossing point between the second straight line L2 and the hypothetical display area HA. In such cases the display control section 261 computes a position of the second crossing point CP2 such that the relative position of the second crossing point CP2 with respect to the first crossing point CP1 is at a specific position in the hypothetical display area HA. As illustrated in FIG. 6, the second crossing point CP2 is positioned in the hypothetical display area HA substantially directly below the first crossing point CP1.

Furthermore, the display control section 261 computes a position of a first display center point SP1 positioned in part of the hypothetical display area HA and further to the left side than the second crossing point CP2, and computes a position of a second display center point SP2 positioned between the first display center point SP1 and the second crossing point CP2. For example, the position of the first display center point SP1 is a position separated toward the right side by a specific distance from a left edge HAl of the hypothetical display area HA, and is a position aligned with a height direction position of the second crossing point CP2. The position of the second display center point SP2 is a center point between the first display center point SP1 and the second crossing point CP2. Note that, the second crossing point CP2 in the hypothetical display area HA, and the positions of the first display center point SP1 and the second display center point SP2, change each time the relative position between the vehicle 12 and the other vehicle 40 changes.

The display control section 261 then controls the projector device 30 so as to align a center point of the ACC image VIacc formed in the hypothetical display area HA by the projector device 30 with the first display center point SP1. When a middle position of the left and right eyes of the driver D is positioned at the eyeball reference position Pe or in the vicinity of the eyeball reference position Pe, the driver D who has seen the ACC image VIacc formed in the hypothetical display area HA visually perceives (has an optical illusion) that a three dimensional image PIC (see FIG. 5 and FIG. 7) is formed (overlaid) in an area A1 of the road 50 between the other vehicle 40 and the vehicle 12.

The display control section 261 then controls the projector device 30 when a specific period of time has elapsed so as to cause the ACC image VIacc formed at the first display center point SP1 to disappear from the hypothetical display area HA, and so as to form the ACC image VIacc in the hypothetical display area HA such that the center point thereof is aligned with the second display center point SP2. The driver D who has seen the ACC image VIacc formed in the hypothetical display area HA visually perceives that the three dimensional image PIC (see FIG. 5 and FIG. 7) is formed on the road 50 at an area A2.

The display control section 261 also controls the projector device 30 after a specific period of time has elapsed so as to cause the ACC image VIacc formed at the second display center point SP2 to disappear from the hypothetical display area HA and to form the ACC image VIacc in the hypothetical display area HA such that the center point thereof is aligned with the second crossing point CP2. The driver D who has seen the ACC image VIacc formed in the hypothetical display area HA visually perceives that the image PIC (see FIG. 5 and FIG. 7) is formed on the road 50 at an area A3. The driver D accordingly perceives (has an optical illusion) that the image PIC (ACC image VIacc) has moved on the road 50 from the left side toward the right side. Furthermore, the display control section 261 controls the position of the second crossing point CP2 in the hypothetical display area HA, such that a distance between the first crossing point CP1 and the second crossing point CP2 is maintained constant in the hypothetical display area HA. The driver D accordingly perceives the image PIC moving on the road 50 so as to follow the other vehicle 40 according to the change in the relative position between the vehicle 12 and the other vehicle 40. The driver D who has seen the ACC image VIacc is accordingly able to perceive that the other vehicle 40 is the target vehicle for following by the vehicle 12. Note that the straight line L2f illustrated in FIG. 7 is a straight line passing through a front edge point Pf of the ACC image VIacc and the eyeball reference position Pe, and the straight line L2r is a straight line passing through a rear edge point Pr of the ACC image VIacc and the eyeball reference position Pe.

Description next follows regarding actions of the display control section 261 when a specific fade-out condition (first condition) has been satisfied. For example, the fade-out condition is satisfied when, for example, any one of the following conditions A to C has been satisfied.

Condition A: A specific period of time (first time period) has elapsed since a time when the ACC image VIacc was formed in the hypothetical display area HA due to the fade-in condition being satisfied. The specific period of time is measured by the timer referred to above. Moreover, the specific period of time is, for example, a freely selected period of time from 4 seconds to 10 seconds.

Condition B: ACC has been interrupted intentionally by the driver D. For example, the driving assistance control section 361 interrupts ACC in a case in which ACC is being executed and the driver D has depressed the accelerator pedal during a period when the driving assistance control section 361 has specified that the other vehicle 40 as the lead vehicle 40LD.

Condition C: The eye direction determination section 263 determines the driver D to be seeing the AR image VIacc based on the detected eye direction ED.

The display control section 261 causes the ACC image VIacc to be displayed in the hypothetical display area HA during a period when the fade-in condition is satisfied. However, in a case in which the display control section 261 has determined that the fade-out condition has been satisfied based on information from the gaze camera 18, the drive source controller ECU 32, or the above timer, the display control section 261 causes the ACC image VIacc to disappear from the hypothetical display area HA while being faded out in the following sequence even in a case in which fade-in condition is satisfied.

Namely, the display control section 261 controls the projector device 30 so as to cause the ACC image VIacc to disappear from the second crossing point CP2, and to form the ACC image VIacc in the hypothetical display area HA, such that the center point thereof is aligned with the second display center point SP2. The display control section 261 then controls the projector device 30 when the specific period of time has elapsed so as to cause the ACC image VIacc formed at the second display center point SP2 to disappear from the hypothetical display area HA and to form the ACC image VIacc in the hypothetical display area HA such that the center point thereof is aligned with the first display center point SP1. The display control section 261 furthermore controls the projector device 30 after the specific period of time has elapsed so as to cause the ACC image VIacc formed at the first display center point SP1 to disappear from the hypothetical display area HA.

The driver D who has seen the ACC image VIacc move in the hypothetical display area HA from the second crossing point CP2 to the first display center point SP1 and disappear at the first display center point SP1, perceives (an optical illusion) that the image PIC (ACC image VIacc) has moved on the road 50 from the area A3 to the area A1 and that the image PIC has disappeared from the road 50 at the area A1.

Next, description follows regarding the operation of the present exemplary embodiment.

Description follows regarding the processing executed by the CPU 26A of the display control ECU 26. The CPU 26A repeatedly executes the processing of the flowchart illustrated in FIG. 8 each time the specific period of time elapses.

At step S10 (hereafter "step" will be omitted), the CPU 26A determines whether or not the vehicle 12 (the ADAS-ECU 36) is executing ACC. The CPU 26A proceeds to S11 in a case in which affirmative determination is made at S10.

The CPU 26A at S11 determines whether or not the fade-in condition has been satisfied based on information received from the ADAS-ECU 36. In a case in which it is determined that the fade-in condition has been satisfied, the CPU 26A determines affirmative at S11 and then proceeds to S12.

At S12, the CPU 26A controls the projector device 30 such that the ACC image VIacc is displayed in the hypothetical display area HA while being faded in.

The CPU 26A proceeds to S13 in a case in which the processing of S12 has finished, and determines whether or not the fade-out condition has been satisfied based on information from the gaze camera 18, the drive source controller ECU 32, or the above timer. When determined that the fade-out condition has been satisfied, the CPU 26A determines affirmative at S13 and then proceeds to S14.

At S14 the CPU 26A controls the projector device 30 such that the ACC image VIacc disappears from the hypothetical display area HA while being faded out.

Figure 8:
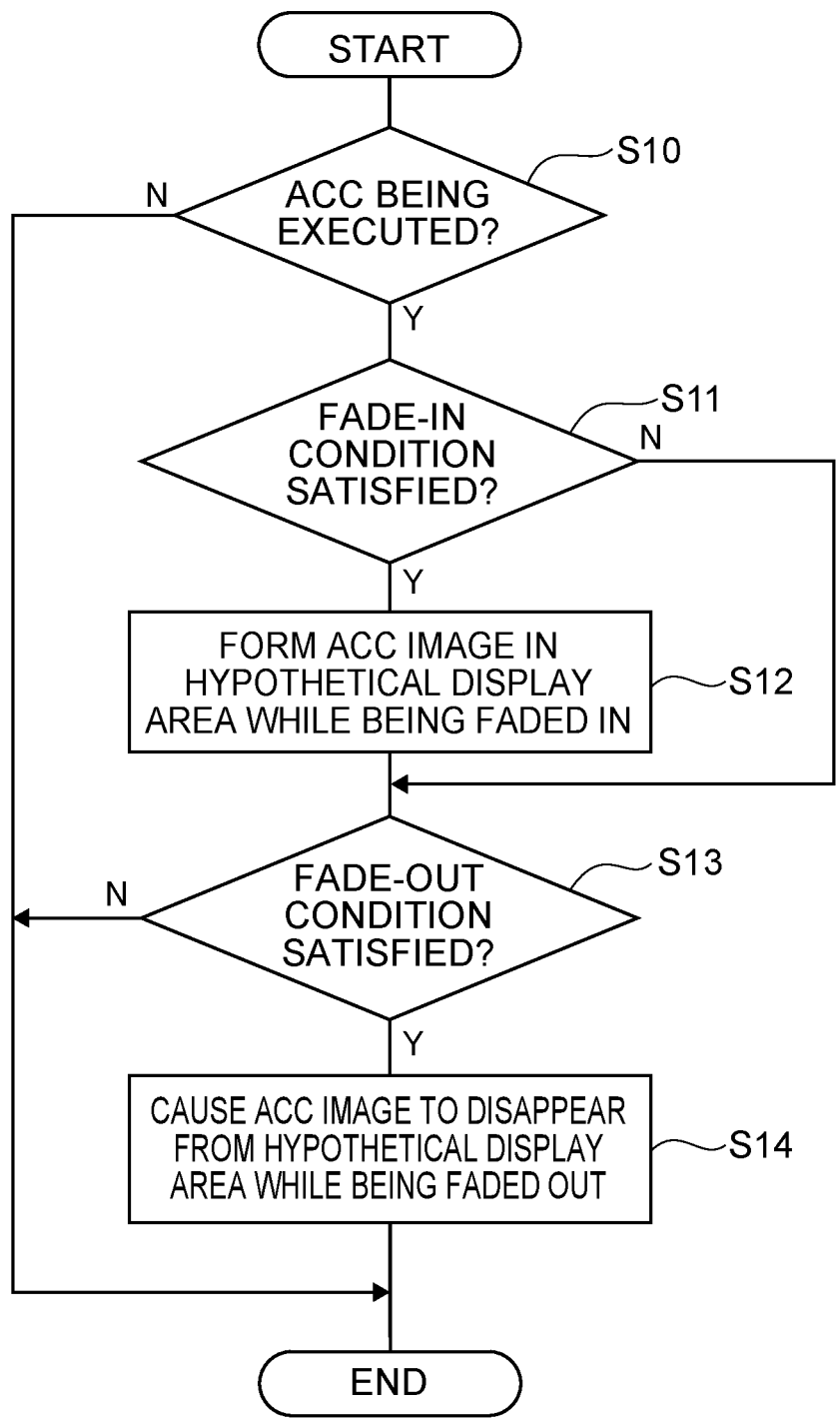
FIG. 8 is a flowchart illustrating processing executed by a CPU of a display control ECU.

In a case in which negative determination is made at S10 or S13, or when the processing of S14 has finished, the CPU 26A temporarily ends the processing of the flowchart of FIG. 8.

As described above, the display control device 10 of the present exemplary embodiment forms the ACC image VIacc corresponding to the other vehicle 40 (lead vehicle 40LD) at a position in front of the vehicle 12 in the hypothetical display area HA. When the fade-out condition has been satisfied after the ACC image VIacc was, the display control device 10 furthermore causes the ACC image VIacc to disappear from the hypothetical display area HA while being faded out. The ACC image (AR image) VIacc formed by the display control device 10 is accordingly less liable to make the driver D feel annoyed when disappearing from the hypothetical display area HA than an AR image that disappears without being faded out.

The ACC image VIacc also disappears from the hypothetical display area HA as a result of condition A being satisfied. Namely, the ACC image VIacc is not displayed for a prolonged period of time in the hypothetical display area HA. This means that the driver D who looks at the hypothetical display area HA is not liable to feel annoyed.

The ACC image VIacc also disappears from the hypothetical display area HA as a result of condition B being satisfied. Namely, the ACC image VIacc disappears from the hypothetical display area HA in a case in which ACC is interrupted intentionally by the driver D. This reduces a concern that the driver D might experience an unsettling feeling looking at the hypothetical display area HA in such a case.

The AR image VIacc also disappears from the hypothetical display area HA as a result of condition C being satisfied. Namely, the ACC image VIacc disappears from the hypothetical display area HA after the driver D has seen the ACC image VIacc. This means the driver D who looks at the hypothetical display area HA is not liable to feel annoyed.

Furthermore, in the display control device 10, the ACC image VIacc is formed in the hypothetical display area HA while being faded in when the fade-in condition has been satisfied. The ACC image (AR image) VIacc formed by the display control device 10 is accordingly less liable to make the driver D feel annoyed when formed in the hypothetical display area HA than an AR image formed in the hypothetical display area HA without being faded in.

Although the display control device 10, a display control method, and a program according to the exemplary embodiment have been described above, appropriate design modifications may be made within a range not departing from the spirit of the present disclosure.

For example, in a case in which the display control section 261 forms a type of AR image different from the ACC image VIacc in the hypothetical display area HA, only an AR image of a particular type may be caused to disappear from the hypothetical display area HA while being faded out, and only an AR image of the particular type may be displayed in the hypothetical display area HA while being faded in. These AR images include, for example, an AR image indicating an intersection in a case in which the vehicle 12 is turning right or turning left at an intersection (display target object), an AR image indicating a demarcation line when there is a risk of a wheel of the vehicle 12 crossing the demarcation line (white line) (display target object) on the road during execution of lane departure alert control, and an AR image indicating a scheduled adjacent lane (display target object) for the vehicle 12 to move into during execution of lane change assistance control. Configuring in this manner means that the driver D who has seen the AR image is not liable to be experience an unsettling feeling compared to cases in which all of the AR images are caused to disappear from the hypothetical display area HA while being faded out, and all of the AR images are displayed in the hypothetical display area HA while being faded in.

In a case in which an AR image of a type different from the ACC image VIacc is formed in the hypothetical display area HA, the display control section 261 may cause fading out to be performed in different fade-out modes according to the type of AR image. For example, in a case in which a particular AR image is caused to disappear from the hypothetical display area HA, a density of a color of the AR image formed at a specific position in the hypothetical display area HA may be decreased gradually so as to gradually reduce a contrast between an area peripheral to the AR image in the hypothetical display area HA and the AR image itself, such that the AR image finally disappears from the hypothetical display area HA. Moreover, in a case in which the particular AR image is caused to disappear from the hypothetical display area HA, after being moved from the second crossing point CP2 to the second display center point SP2, the AR image may be moved to the first display center point SP1, and also the density of color may be lowered when positioned at the second display center point SP2 to lower than the color density when positioned at the second crossing point CP2, the color density may be lowered when positioned at the first display center point SP1 to a lower color density than when positioned at the second display center point SP2, and the AR image at the first display center point SP1 may be caused to disappear from the hypothetical display area HA. Adopting such an approach means that the driver D who has seen the AR image is less liable to experience an unsettling feeling than cases in which the same fading out mode is adopted for fading out all of the AR images.

Moreover, in a case in which a type of AR image different from the ACC image VIacc is formed in the hypothetical display area HA, the display control section 261 may employ different modes of fade-in according to the type of AR image. For example, in a case in which a particular AR image is being formed in the hypothetical display area HA, the density of color of an AR image formed at a specific position in the hypothetical display area HA may be gradually raised so as to gradually increase a contrast between an area peripheral to the AR image in the hypothetical display area HA and the AR image itself. Moreover, in a case in which the particular AR image is formed in the hypothetical display area HA, after being moved from the first display center point SP1 to the second display center point SP2, the AR image may be moved to the second crossing point CP2, and also the color density may be raised when positioned at the second display center point SP2 to higher than the color density when positioned at the first display center point SP1, and the color density may be raised when positioned at the second display center point SP2 to a higher color density than when positioned at the second crossing point CP2. Adopting such an approach means that the driver D who has seen the AR image is less liable to experience an unsettling feeling than cases in which the same fade-in mode is adopted for fading in all of the AR images.

A time taken to move the ACC image VIacc from the first display center point SP1 to the second crossing point CP2 in a case in which the ACC image VIacc is being formed in the hypothetical display area HA while being faded in may be made shorter than a time taken to move the ACC image VIacc from the second crossing point CP2 to the first display center point SP1 in a case in which the ACC image VIacc is caused to disappear from the hypothetical display area HA while being faded out.

Remarks

The display control device of the present disclosure may be configured by a freely selected combination of the following Configuration 1 to Configuration 8.

Configuration 1: A display control device installed at a vehicle and that forms an AR image corresponding to a display target object at a position in front of the vehicle in a hypothetical display area set in front of the vehicle. The display control device causes the AR image to disappear from the hypothetical display area while being faded out when a first specific condition has been satisfied after the AR image was formed.

Configuration 2: A display control device wherein the AR image is formed in the hypothetical display area while being faded in when a second specific condition has been satisfied.

Configuration 3: A display control device wherein there are plural types of AR images formable in the hypothetical display area, and only an AR image of a particular type is caused to disappear from the hypothetical display area while employing the fading out.

Configuration 4: A display control device wherein a mode of the fading out, is changed according to the type of the AR image.

Configuration 5: A display control device wherein there are plural types of AR images formable in the hypothetical display area, and only an AR image of a particular type is formed in the hypothetical display area while employing the fading in.

Configuration 6: A display control device wherein a mode of the fading in, is changed according to the type of the AR image.

Configuration 7: A display control device wherein the first specific condition is satisfied when a first time period has elapsed from a time in a case in which the AR image was formed in the hypothetical display area.

Configuration 8: A display control device wherein the first specific condition is satisfied in a case in which it is determined that a driver of the vehicle has seen the AR image based on imaging data acquired by an in-car camera provided to the vehicle.

Furthermore, a display control method of the present disclosure may be configured by the following Configuration 9 combined with at least one out of the Configurations 1 to 8. Configuration 9: A display control method employed in a vehicle and including, forming an AR image corresponding to a display target object at a position in front of the vehicle in a hypothetical display area set in front of the vehicle, the display control method causing the AR image to disappear from the hypothetical display area while being faded out when a first specific condition has been satisfied after the AR image was formed.

Furthermore, a program according to the present disclosure may be configured by the following Configuration 10, combined with at least one out of the Configurations 1 to 8. Configuration 10: A program that causes a computer to execute processing of forming an AR image corresponding to a display target object at a position in front of a vehicle in a hypothetical display area set in front of the vehicle, with the program causing the computer to execute processing of causing the AR image to disappear from the hypothetical display area while being faded out when a first specific condition has been satisfied after the AR image was formed.

What is claimed is:

1. A display control device installed at a vehicle, comprising:
   a memory, and
   a processor coupled to the memory, the processor is configured to:
   form an AR image corresponding to a display target object at a position in front of the vehicle in a hypothetical display area set in front of the vehicle; and
   cause the AR image to disappear from the hypothetical display area while being faded out in a case in which a first specific condition has been satisfied after the AR image was formed,
   wherein the processor is configured to:
   form a plurality of different types of AR images in the hypothetical display area at a same time; and
   cause only an AR image of a particular type to disappear from the hypothetical display area while employing the fading out.

2. The display control device of claim 1, wherein the processor is configured to form the AR image in the hypothetical display area while being faded in, in a case in which a second specific condition has been satisfied.

3. The display control device of claim 1, wherein the processor is configured to change a mode of the fading out, according to the type of the AR image.

4. The display control device of claim 2, wherein the processor is configured to:
   form only an AR image of a particular type in the hypothetical display area while employing the fading in.

5. The display control device of claim 4, wherein the processor is configured to change a mode of the fading in, according to the type of the AR image.

6. The display control device of claim 1, wherein the first specific condition is satisfied in a case in which a first time period has elapsed from a time when the AR image was formed in the hypothetical display area.

7. The display control device of claim 1, wherein the first specific condition is satisfied in a case in which it is determined that a driver of the vehicle has seen the AR image based on imaging data acquired by an in-car camera provided to the vehicle.

8. A display control method comprising:
   forming an AR image corresponding to a display target object at a position in front of the vehicle in a hypothetical display area set in front of the vehicle;
   causing the AR image to disappear from the hypothetical display area while being faded out when a first specific condition has been satisfied after the AR image was formed;
   forming a plurality of different types of AR images in the hypothetical display area at a same time; and
   causing only an AR image of a particular type to disappear from the hypothetical display area while employing the fading out.

9. A non-transitory computer-readable medium storing a program that causes a computer to execute processing, the processing comprising:
   forming an AR image corresponding to a display target object at a position in front of a vehicle in a hypothetical display area set in front of the vehicle;
   causing the AR image to disappear from the hypothetical display area while being faded out when a first specific condition has been satisfied after the AR image was formed;
   forming a plurality of different types of AR images in the hypothetical display area at a same time; and
   causing only an AR image of a particular type to disappear from the hypothetical display area while employing the fading out.

* * * * *